United States Patent [19]
Cone

[11] Patent Number: 5,850,222
[45] Date of Patent: Dec. 15, 1998

[54] METHOD AND SYSTEM FOR DISPLAYING A GRAPHIC IMAGE OF A PERSON MODELING A GARMENT

[75] Inventor: Don Cone, San Diego, Calif.

[73] Assignee: Pixel Dust, Inc., Vashon, Wash.

[21] Appl. No.: 529,161

[22] Filed: Sep. 13, 1995

[51] Int. Cl.⁶ .................................................. G06T 17/00
[52] U.S. Cl. ........................................ 345/418; 345/419
[58] Field of Search .................................... 395/118, 119, 395/125, 143, 142, 121; 364/470.1; 382/100; 345/139

[56] References Cited

U.S. PATENT DOCUMENTS

| | | | |
|---|---|---|---|
| 4,149,246 | 4/1979 | Goldman | 364/200 |
| 4,261,012 | 4/1981 | Maloomian | 358/93 |
| 4,434,467 | 2/1984 | Scott | 364/400 |
| 4,539,585 | 9/1985 | Spackova et al. | 358/93 |
| 4,546,434 | 10/1985 | Gioello | 364/300 |
| 4,823,285 | 4/1989 | Blancato | 364/521 |
| 4,843,574 | 6/1989 | Gerber | 364/526 |
| 4,872,056 | 10/1989 | Hicks et al. | 358/183 |
| 4,885,844 | 12/1989 | Chun | 33/15 |
| 4,888,713 | 12/1989 | Falk | 364/522 |
| 4,949,286 | 8/1990 | Ohba | 364/521 |
| 5,060,171 | 10/1991 | Steir et al. | 364/521 |
| 5,077,608 | 12/1991 | Dubner | 358/183 |
| 5,247,610 | 9/1993 | Oshima et al. | 395/135 |
| 5,255,352 | 10/1993 | Falk | 395/125 |
| 5,309,549 | 5/1994 | Iwamoto et al. | 395/121 |
| 5,333,245 | 7/1994 | Vecchione | 395/130 |
| 5,375,195 | 12/1994 | Johnson | 395/135 |
| 5,504,845 | 4/1996 | Vecchione | 395/119 |
| 5,530,652 | 6/1996 | Croyle et al. | 364/470 |

FOREIGN PATENT DOCUMENTS

| | | |
|---|---|---|
| 0 447 222 A2 | 9/1991 | European Pat. Off. . |
| 0 454 129 A2 | 10/1991 | European Pat. Off. . |

OTHER PUBLICATIONS

B.K. Hinds and J. McCartney, "Interactive garment design," *The Visual Computer International Journal of Computer Graphics,* vol. 6, No. 2, pp. 53–61, XP 000610788, 1990.

*Primary Examiner*—Phu K. Nguyen
*Assistant Examiner*—Cliff N. Vo
*Attorney, Agent, or Firm*—Seed and Berry LLP

[57] ABSTRACT

In a preferred embodiment, the present invention provides a computer system for displaying clothing on a rendered image of a human body referred to as a virtual dressing room system ("VDRS"). The VDRS receives a series of contour lines defining the three-dimensional shape of the human body. A contour line is a series of points that defines the perimeter of the body in a horizontal plane. The VDRS also receives a sequence of points defining the two-dimensional shape of the clothing. The VDRS also scales the sequence of points defining the two-dimensional shape of the clothing to the approximate width of a portion of the human body over which the clothing is worn. For each point of the two-dimensional shape, the VDRS identifies a corresponding point on a contour line, and adjusts the point of the two-dimensional shape of the clothing to correspond to the identified point. The VDRS renders the shape of the human body on a display device, and lenders the scaled and adjusted two-dimensional shape of the clothing on the display device to effect the display of the human body wearing the clothing.

26 Claims, 17 Drawing Sheets

METHOD AND SYSTEM FOR DISPLAYING A GRAPHIC IMAGE OF A PERSON MODELING A GARMENT

DESCRIPTION

TECHNICAL FIELD

The present invention relates generally to the field of computer graphics and, more particularly, to the field of representing and rendering graphics objects.

BACKGROUND OF THE INVENTION

The trying-on of clothing for purchase and subsequent tailoring of the clothing has often been a difficult experience for the consuming public. First, a person needs to travel to the clothing store. Second, the person needs to select a garment that may or may not fit. Third, the person removes the clothing currently being worn. Fourth, the person puts on the selected garment. Fifth, the person determines if the garment fits and whether its appearance is acceptable. Sixth, the person takes off the selected garment. Seventh, the person puts back on the clothing that was currently worn. Many of these steps need to be repeated for each garment selected.

This process for purchasing clothing has many disadvantages. These disadvantages include the amount of time needed to try on different garments, the inconvenience to which the person is put in traveling to the clothing store, the possibility that the clothing store is out of stock of certain garments, and the possibility that the garment will look differently when tailored.

Some people purchase clothing through alternate means such as by purchasing clothing through catalogs, through television programs, or through computer systems. Although these alternate means have certain advantages, such as elimination of travel time, these alternate means increase the risk that clothing will not fit when received or its appearance will be unacceptable.

It would be desirable to have a technique in which a person could approve the appearance and fitting of a garment without having to actually try on the garment. It would further be desirable to have a system for displaying an image of person wearing a selected garment that is tailored to the person's figure. However, such a system that uses conventional computer graphics techniques would be prohibitively expensive.

The field of computer graphics has evolved as a result of the extensive use of computer systems for the display and manipulation of graphics objects. The study of computer graphics has focused on finding algorithms that are both efficient and provide an accurate representation of real-life objects, such as automobiles, airplanes, people, etc. Even though the computational power of computer systems is increasing significantly, the efficiency of the algorithms, nevertheless, has a significant impact on marketability of computer products that use the principles of computer graphics.

Any computer graphics algorithm for manipulating a representation of a real-life object in a computer system is dependent on the data that is used to represent the object. For example, a ball can be represented by the location of its origin in three-dimensional space and by its radius, and a box can be represented by the location of a corner and its width, height, and depth. As the complexity of a real-life objects increases, the data needed to represent the object in the computer system also increases. For example, a human body may be represented by a polygon mesh that comprises thousands of polygons, which together defined the surface of the human's body. Thus, the manipulation of such complex real-life object takes more computational power than the simpler real-like objects.

It would be desirable to have a computer system that could, in a fast and cost-effective manner, allow a person to select a garment, could tailor a computer image of the garment to the person's figure, and could display an image of the person's figure wearing the garment.

SUMMARY OF THE INVENTION

In a preferred embodiment, the present invention provides a computer system for displaying clothing on a rendered image of a human body referred to as a virtual dressing room system ("VDRS"). The VDRS receives a series of control lines defining the three-dimensional shape of the human body. A contour line is a series of points that defines the perimeter of the body in a horizontal plane. The VDRS also receives a sequence of points defining the two-dimensional shape of the clothing. The VDRS also scales the sequence of points defining the two-dimensional shape of the clothing to the approximate width of a portion of the human body over which the clothing is worn. For each point of the two-dimensional shape, the VDRS identifies a corresponding point on a contour line, and adjusts the point of the two-dimensional shape of the clothing to correspond to the identified point. The VDRS renders the shape of the human body on a display device, and renders the scaled and adjusted two-dimensional shape of the clothing on the display device to effect the display of the human body wearing the clothing.

The VDRS represents a surface of a three-dimensional graphics object (e.g., the human body) by dividing the graphic object into slices along a first axis such that each slice corresponds to a portion of the surface of the graphics object. For each of the slices, the VDRS identifies a contour line that corresponds to that portion of the surface of the graphics object to which the slice corresponds such that the contour line is in a plane that is perpendicular to the first axis. The VDRS then stores a representation of the contour line in the computer system.

The VDRS system also combines surfaces of a first and a second graphics object (such as a body and breast). The VDRS represents the graphics objects by contour lines. Each contour line represents a portion of the surface of the graphics object, is in a single plane, and has points. The contour lines are in parallel planes and each contour line of the first object has a corresponding contour line of the second object. The corresponding contour lines of the first and second objects are in the same plane. For each of the corresponding contour lines of the first and second graphics objects, the VDRS determines whether each point of the contour line of the first graphics object is within the contour line of the second graphics object and determines whether each point of the contour line of the second graphics object is within the contour line of the first graphics object. Based on these determinations, the VDRS selects the points of the corresponding contour lines of the first and second graphics objects as representing the portion of the combined surfaces of the first and second graphics object that corresponds to the corresponding lines of the first and second graphics objects.

DETAILED DESCRIPTION OF THE INVENTION

The present invention provides a virtual dressing room system that allows a person to try on various garments virtually. The virtual dressing room system (VDRS) displays an image of the person wearing a selected garment that is tailored to the person's figure. The VDRS receives the person's measurements, shapes an image of the person based on the measurements, and then tailors the selected garment to the person's figure. The image of the person can be rotated to view the sides and the back. In this way, a person can see how various garments would look on them without actually wearing the garments and without actually tailoring the garment to fit the person.

In a preferred embodiment, the VDRS represents the person's body in three-dimensions and the garments in two-dimensions. The VDRS two-dimensional image of a garment is preferably generated by digitizing images of a standard mannequin with a standard figure wearing the garment. The VDRS then receives the person's measurements and generates a data structure that represents the person's figure in three-dimensions. The VDRS then tailors the two-dimensional image of the garment to the three-dimensional representation of the person's figure. The VDRS then displays the representation of the person wearing the tailored image of the garment. Because the person's figure is represented in three-dimensions and because the image of the garment is digitized from a three-dimensional mannequin wearing the garment, the VDRS provides an accurate representation of what the person would look like wearing the garment.

Figure 1:
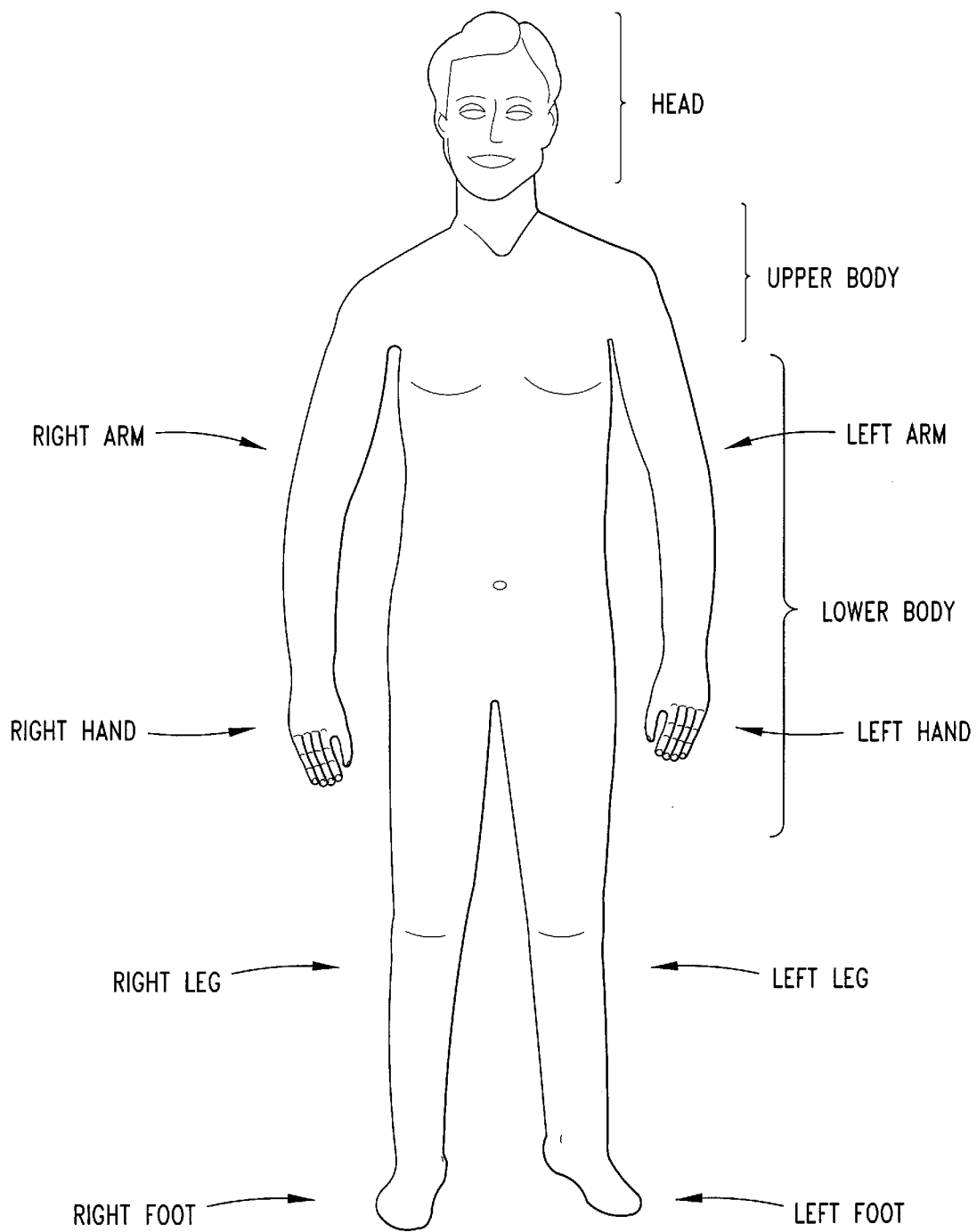
FIG. 1 is a diagram illustrating the body parts.

The VDRS system represents a body as a collection of three-dimensional body parts. Table 1 contains a list of the body parts. FIG. 1 is a diagram illustrating the body parts.

TABLE 1 head
upper body
lower body

TABLE 1-continued right arm
left arm
right leg
left leg
right foot
left foot

The VDRS represents each body pall as a graphics object that is either stored as a polygon mesh or a contour surface. The head and extremities (i.e., hands and feet) are each represented by a polygon mesh, and the upper and lower body and the limbs (i.e., arms and legs) are each represented by a contour surface. The head and extremities are preferably represented by a polygon mesh because of the surface detail needed to accurately represent these body parts. Conversely, the body and limbs are preferably represented by a contour surface because it allows for efficiently shaping the contour surfaces to a person's measurements, efficient tailoring of the garments to the person's figure, for rapidly displaying the surface, and for reducing the amount of storage needed to represent the person's body.

A polygon mesh is a list of points and connecting edges that defines the surface of a graphics object. In a polygon mesh, each edge is shared by, at most, two polygons. The collection of polygons defines the surface of a graphics object (e.g., a body part). (A thorough discussion of polygon meshes is provided in "Computer Graphics—Principles and Practice" ["Computer Graphics"], Foley, van Dam, Feiner, Hughes, Addison-Wesley Publishing Co., 2nd Ed., 1990, in Chap. 11.)

A contour surface is a sequence of contour lines that defines the surface of a graphics object. Each contour line is a path of points that lies in a single plane and defines the intersection of the surface of the graphics object with the plane. For example, the upper body is a body pail that stalls at the top of the neck and ends at the top of the armpit and is represented by a contour surface comprising, for example, 16 contour lines. The right arm is a body part that stalls at the right shoulder and ends at the right wrist and is represented by a contour surface comprising, for example, 80 contour lines. Each contour line initially contains, for example, 33 points that are defined in a three-dimensional space. The x-coordinate represents the width of the body; the y-coordinate represents the height of the body; and the z-coordinate represents the depth of the body. All y-coordinates of a contour line are initially set to the same value, that is, the contour lines are initially in a plane that is parallel to the plane formed by the x and z axes.

Figure 2A:
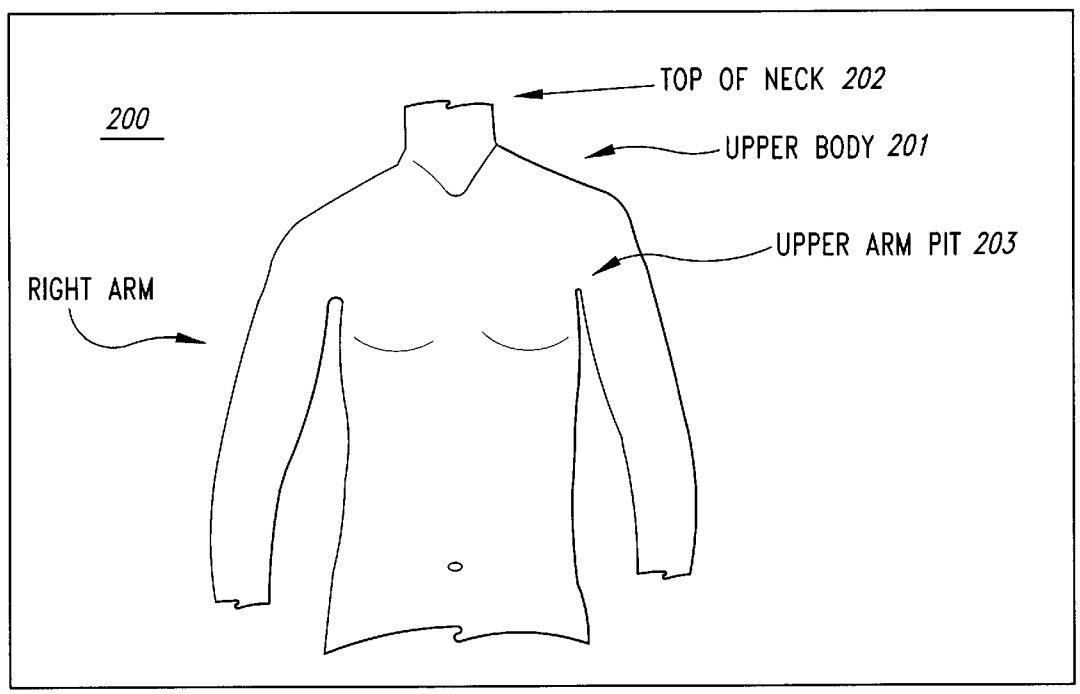
FIG. 2 is a diagram illustrating the upper body represented by a contour surface.
Figure 2B:
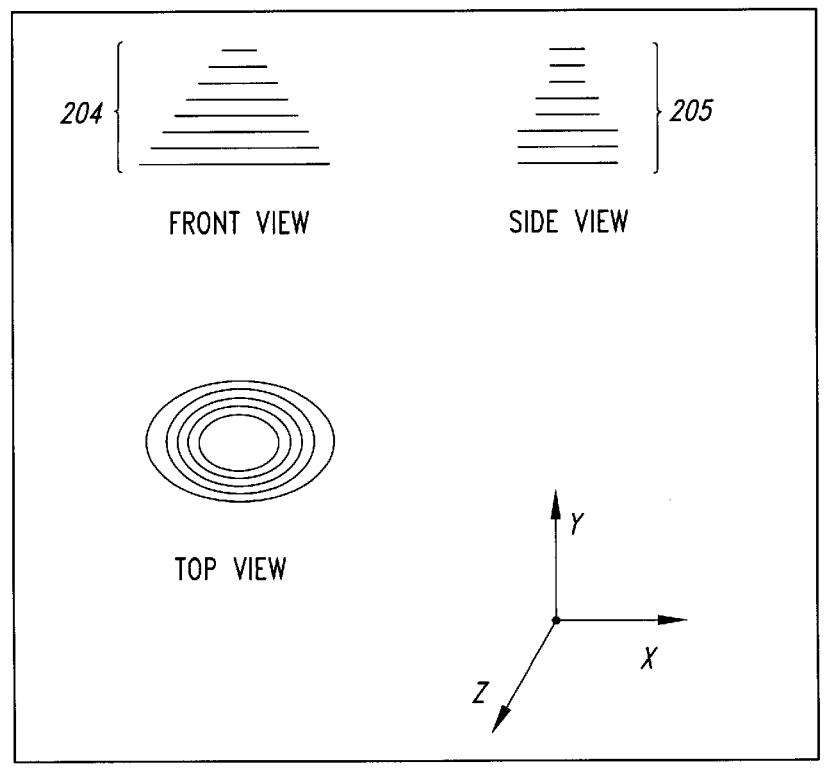

FIG. 2 is a diagram illustrating the upper body represented by a contour surface. The upper body 201 starts at the top of the neck 202 and extends to the top of the airpit 203. The front view 204, the side view 205, and the top view 206 illustrate various projections of the contour lines that form the contour surface of the upper body. The top view illustrates that the points of each contour line form a path, and the front and side views illustrate that all the points in a contour line lie in a single plane that is parallel to the plane formed by the x and z axes. One skilled in the all would appreciate that the number of points in a contour line or the number of contour lines in a contour surface can be varied to improve the resolution of the representation of the body part.

Figure 3:
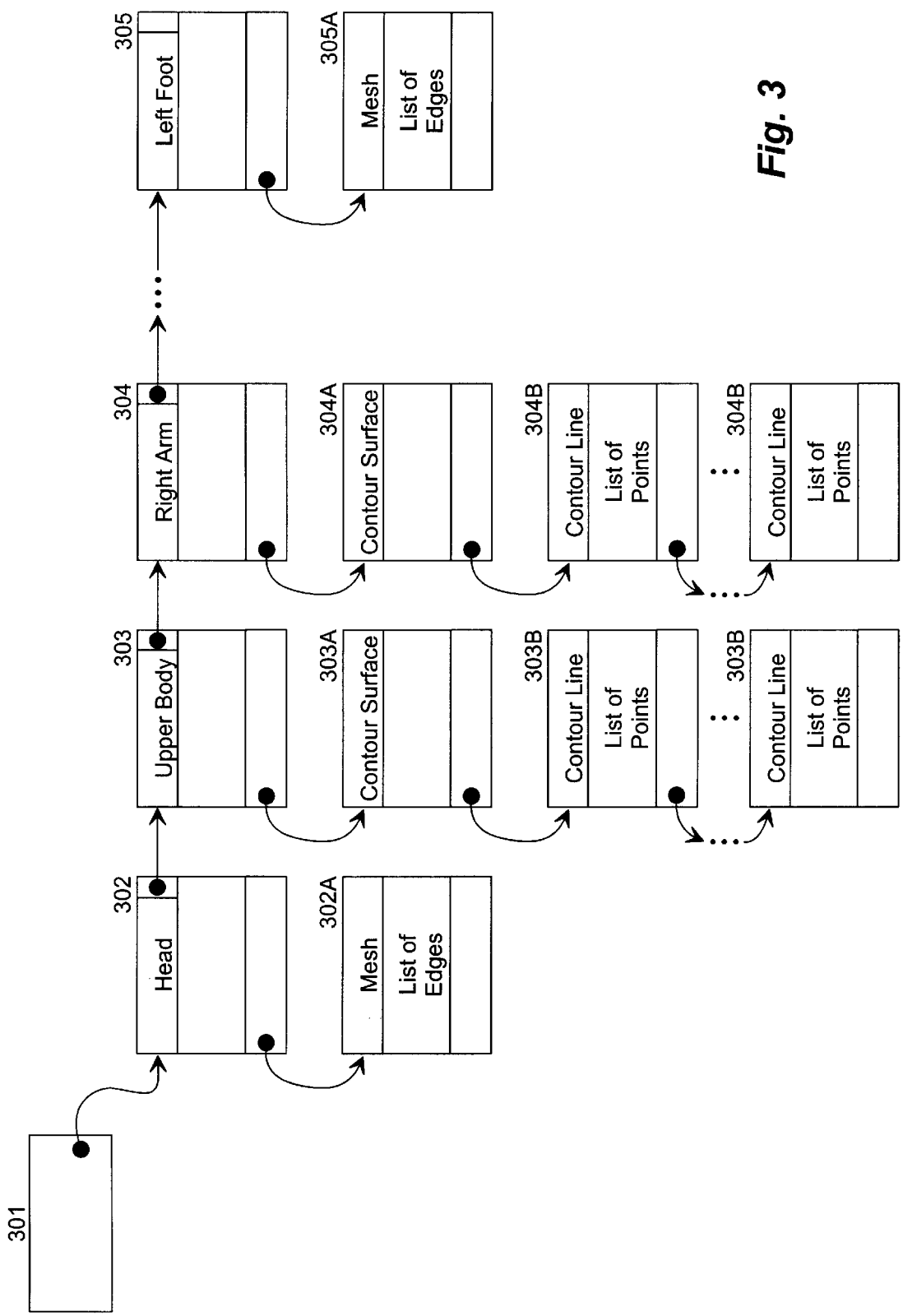
FIG. 3 is a block diagram illustrating a body data structure that represents a body in three dimensions.

FIG. 3 is a block diagram illustrating a body data structure that represents a body in three dimensions. The body data structure includes body part data structures 302–305 for each body pal. Each body part data structure contains a reference to a graphics object data structure 302A–305A. Each graphics object data structure is either a polygon mesh or a contour surface graphics object. The polygon mesh graphics object data structures 302A, 305A each describes a collection of polygons that defines the surface of the corresponding body part. The contour surface graphics object data structures 303A, 304A each contains a reference to a list of contour line data structures 303B, 304B. Each contour line data structure contains a list of points that define the perimeter of the body part at one plane. The points of a contour line are in a single plane, and initially the plane is perpendicular to the y-axis.

Shaping the Figure

The VDRS uses the person's measurements to create a body data structure that represents the person's figure. The VDRS defines a standard figure for a human body (a mannequin) and stores a representation of the standard figure in a body data structure. The VDRS starts with the body data structure for the standard body and adjusts the body part data structure so they represent the person's figure. The VDRS shapes the standard figure into the person's figure based on these measurements. Each measurement is associated with a contour line of the body data structure. Table 2 contains a list of measurements that the VDRS uses to describe the figure of a female.

TABLE 2

| Measurements | Definition |
| --- | --- |
| neck | circumference of the neck at its midpoint |
| armpit line | distance from the top of the left to the top of the right |
| bust | front circumference of the body at the center of the bust |
| under bust | circumference of the body just under the bust |
| cup | size of the breast |
| bust span | distance from the outside of the left breast to the outside of the right breast |
| navel | circumference of the body at the navel |
| waist | circumference of the body at the waist |
| abdomen | circumference of the body at the abdomen |
| hip | circumference of the body at the hip |
| hip to navel | distance from the hip to the navel |
| armpit to waist | distance from the armpit to the waist |
| shoulder | circumference of the body at the shoulders |
| shoulder front | width of the body at the shoulders |
| armpit center line | width of the body at the armpits |
| crotch to ankle | distance from the crotch to the ankle |
| crotch to knee | distance from the crotch to the knee |
| thigh | circumference of each thigh |
| knee | circumference of each knee |
| calf | circumference of each calf |
| ankle | circumference of each ankle |
| shoulder to wrist | distance from each shoulder to the wrist |
| shoulder to elbow | distance from each shoulder to the elbow |
| bicep | circumference of each bicep |
| elbow | circumference of each elbow |
| wrist | circumference of each wrist |
| total height | height of the person |

The VDRS also receives various scale factors to apply to the body part data structures. Alternatively, the VDRS can derive these various scale factors from the person's measurements. Table 3 contains a list of the scale factors.

TABLE 3

| Scale Factor | Definition |
| --- | --- |
| thigh | scale factor to apply to circumference of thigh |
| waist | scale factor to apply to circumference of waist |
| inner leg | scale factor to apply to height of inner leg |
| body width | scale factor to apply to width of body |
| body depth | scale factor to apply to depth of body |
| head width | scale factor to apply to width of head |
| head depth | scale factor to apply to depth of head |
| torso width | scale factor to apply to width of torso |
| torso depth | scale factor to apply to depth of torso |
| upper hip width | scale factor to apply to width of upper hip |
| upper hip depth | scale factor to apply to depth of upper hip |
| hip width | scale factor to apply to width of hip |
| hip depth | scale factor to apply to depth of hip |
| crotch width | scale factor to apply to width of crotch |
| crotch depth | scale factor to apply to depth of crotch |
| stomach | scale factor to apply to depth of stomach |
| breast center depth | scale factor to apply to depth of breast at its center |
| breast center horizontal | scale factor to apply to horizontal position of breast |
| breast center vertical | scale factor to apply to vertical position of breast |
| breast outer | scale factor to apply to length of outer portion of breast |
| breast inner | scale factor to apply to length of inner portion of breast |
| breast upper | scale factor to apply to length of upper portion of breast |
| breast lower | scale factor to apply to length of lower portion of breast |
| breast depth | scale factor to apply to depth of breast |
| breast tilt | scale factor to apply to angle of tilt of breast |

The VDRS then applies these scale factors to the body data structure as it is shaping the representation of the standard figure into the person's figure. The VDRS applies these scale factors to the body part to which each corresponds. For example, the head width and depth scale factors are applied to the polygon mesh graphics object that represents the head by adjusting each point in the polygon mesh. The body width and depth scale factors are applied to the contour surface graphics objects that represent the body and the limbs. Each point on each contour line is adjusted accordingly.

Tailoring the Garment

The VDRS tailors a garment by first scaling the garment to the height and width of the person's body area over which the garment is worn and then by fitting the garment to the person's body at various control points. A garment is represented by a two-dimensional image of the garment as it is worn by the mannequin. In one embodiment, the two-dimensional image is created by taking a photograph of the garment as it is worn by the mannequin and then digitizing the photograph. Because the image is a two-dimensional representation of the garment as it appears in three-dimensions, the image is a more accurate representation than simply an image derived from the garment laying on a flat surface.

The VDRS defines the body areas over which a garment is to be worn. For example, the body areas for a female body include a bikini top, blouse, bikini bottom, pants, and skirt. Each garment is assigned a body area.

To scale the garment, the VDRS adjusts the height and width of the image of the garment to the approximate height and width of the body area over which it is to be worn. For example, if the width of the chest of the standard figure is 16 inches and the width of the chest of the person is 20 inches, then the VDRS scales the width of the image of garment of the type bikini top by 125% (20÷16). This scaling gives a first approximation of the tailoring. The VDRS then fits the scaled garment to the details of the various garment control points of the garment that are typically specified when a garment is first provided to the VDRS. The VDRS defines various body control points for each body area. When a garment is defined, the garment control points are defined along with attributes of the control points. The attributes of the garment control points indicate whether the garment at the garment control point is to be stretched to fit the body area or whether the garment at the control point is to hang (e.g., a control point on a dress hem). To fit the garment, these garment control points are moved to coincide with the corresponding body control points on the person's figure. The image of the garment is stretched or contracted in the area of the garment control point so that the points coincide.

Rendering the Figure and Garment

The VDRS renders the person's figure wearing the tailored garment by incrementally converting the contour surfaces to a polygon mesh and sending the polygons to a standard polygon mesh rendering engine. The rendering engine renders the polygon with shading based on the position of a light source. After the person's figure is rendered, the VDRS displays the tailored garments over the person's figure. The VDRS also renders the head and extremities from their polygon meshes and preferably displays an image of the person's face over the head. (A discussion of polygon meshes is provided in "Computer Graphics" in Chapter 16.)

Components of the VDRS

Figure 4:
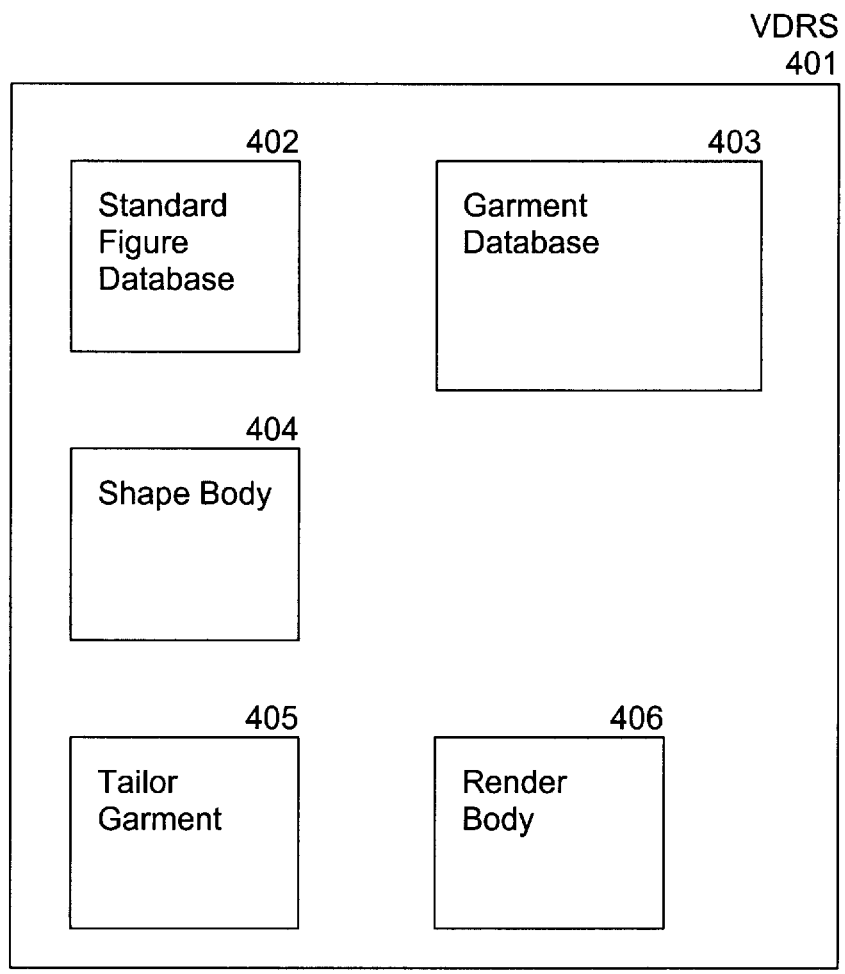
FIG. 4 is a diagram illustrating the components of a preferred embodiment.

FIG. 4 is a diagram illustrating the components of a preferred embodiment. The preferred VDRS 401 includes a standard figure database 402, a garment database 403, a shape body procedure 404, a tailor garment procedure 405, and a render body procedure 406. The components are stored in and executed in a computer system such as a personal computer. The standard figure database contains the body data structure for the standard figure along with various measurements for the standard figure. The VDRS uses these measurements when calculating the scale factors for shaping the body. The garment database contains the two-dimensional image of each garment of the body area over which the garment is worn, and the attributes of the garment control points. The shape body procedure inputs the body data structure for the standard figure, the person's measurements, and scale factors developed from the person's measurement, and returns a body data structure that is shaped to the person's figure. The tailor garment procedure inputs the person's body data structure and data defining a garment and returns the data defining the garment that is tailored to the person's figure. The render body procedure inputs the person's body data structure and data defining the tailored garments and renders the person's body and the garment on a display device.

Shape Body

Figure 5:
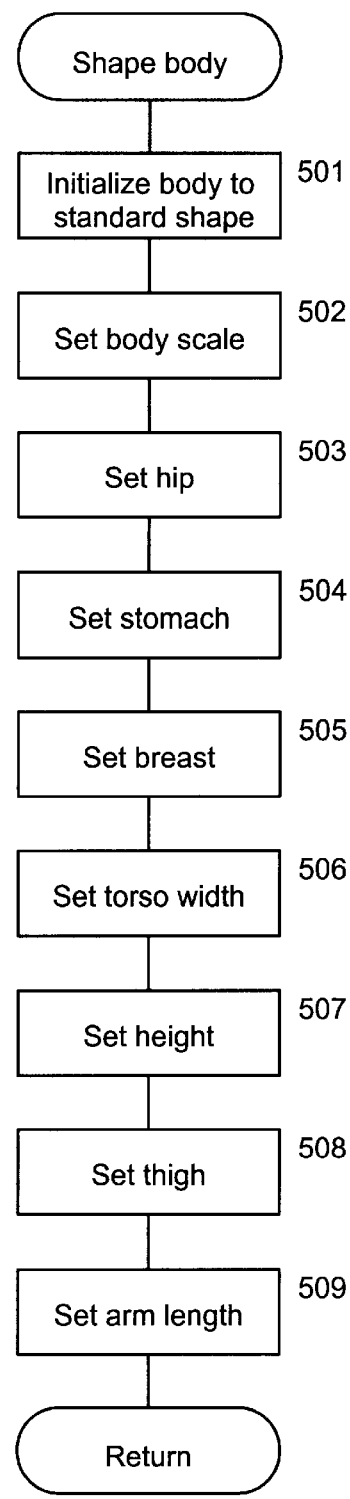
FIG. 5 is a flow diagram of the ShapeBody method.

FIG. 5 is a flow diagram of the ShapeBody method. The ShapeBody method receives the person's measurements and scale factors, retrieves the body data structure for the standard figure, and shapes the body data structure to represent the person's figure. In step 501, the ShapeBody method initializes a body data structure to the standard figure. The body data structure for the standard figure is preferably stored in the standard figure database. In step 502, the ShapeBody method invokes the SetBodyScale method to scale the head in accordance with the head width and depth scale factors and to scale the body and the limbs according to the body width and depth scale factors. The body width and depth scale factors represent the overall proportions between the standard figure and the person's figure. The other scale factors are used to account for variations from the overall proportions. In step 503, the ShapeBody method invokes the SetHip method which adjusts the shapes of the hips in accordance with the upper hip width, the hip width, and crotch width scale factors. In step 504, the ShapeBody method invokes the SetStomach method to adjust the stomach based on the stomach scale factor. In step 505, the ShapeBody method invokes the method SetBreast to adjust the breast according to the breast scale factors. In step 506, the ShapeBody method invokes the SetTorsoWidth method to adjust the width of the upper and lower body based on the torso width scale factor and moves the limbs accordingly. In step 507, the SetHeight adjusts the height based on height scale factor. In step 508, the ShapeBody method adjusts the thighs based on the thigh scale factor. In step 509, the ShapeBody method adjusts the arm lengths based on the arm length scale factor. The ShapeBody method then returns.

Figure 6:
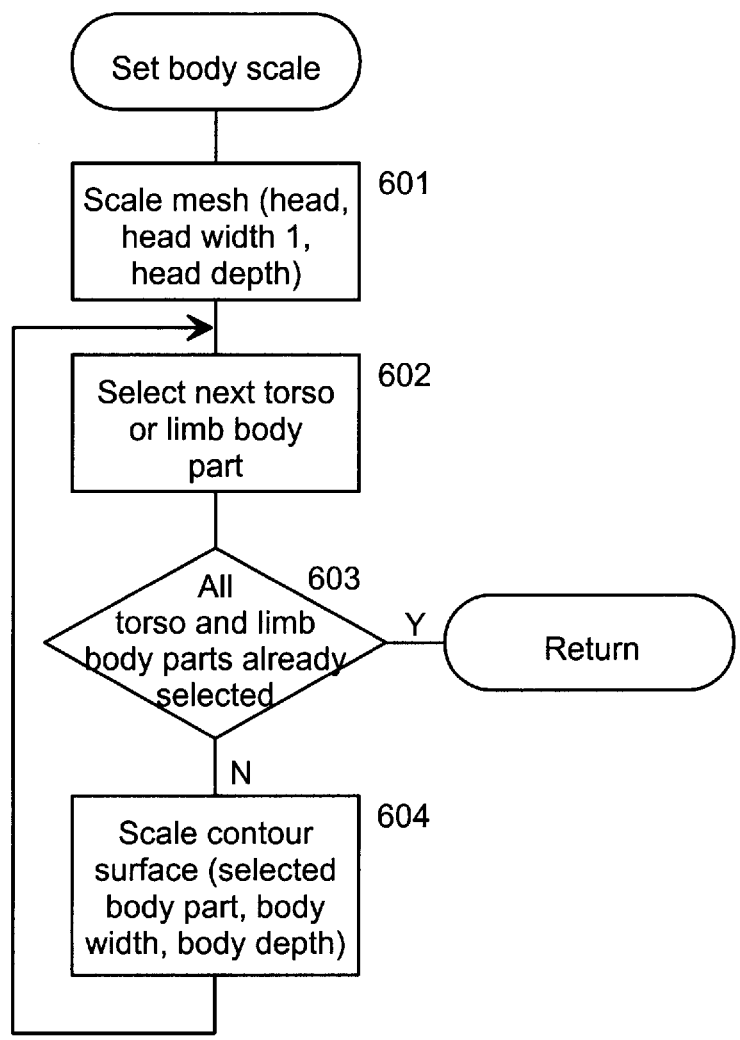
FIG. 6 is a flow diagram of the SetBodyScale method.

FIG. 6 is a flow diagram of the SetBodyScale method. The SetBodyScale method adjusts the width and depth of the head and adjusts the depth and width of the torso and limbs. This method adjusts the body data structure to the overall proportions of the person. In step 601, the method scales the head using a scale mesh procedure that creates a transform matrix based on the passed scale factors and multiplies each point in the head by the transform matrix. The use of matrix transformations to rotate, translate, and scale points in a three-dimensional space are well-known in the art. (A discussion of such transformations is provided in "Computer Graphics" in chapter 5.) The points in head are scaled so that the overall width and depth correspond to the person's head. In steps 602–604, the SetBodyScale method loops adjusting each of the torso and limb body parts. In step 602, the SetBodyScale selects the next torso or limb body part. In step 603, if all the torso and limb body parts have already been selected, the method returns, else the SetBodyScale method loops to step 604. In step 604, the method scales the selected body part according to body width and depth scale factors. Each of the torso and limb body parts are represented by contour surfaces. The method generates a transform matrix based on the body width and depth scale factors and multiplies each point in each contour line of the contour surface by the transform matrix.

Figure 7:
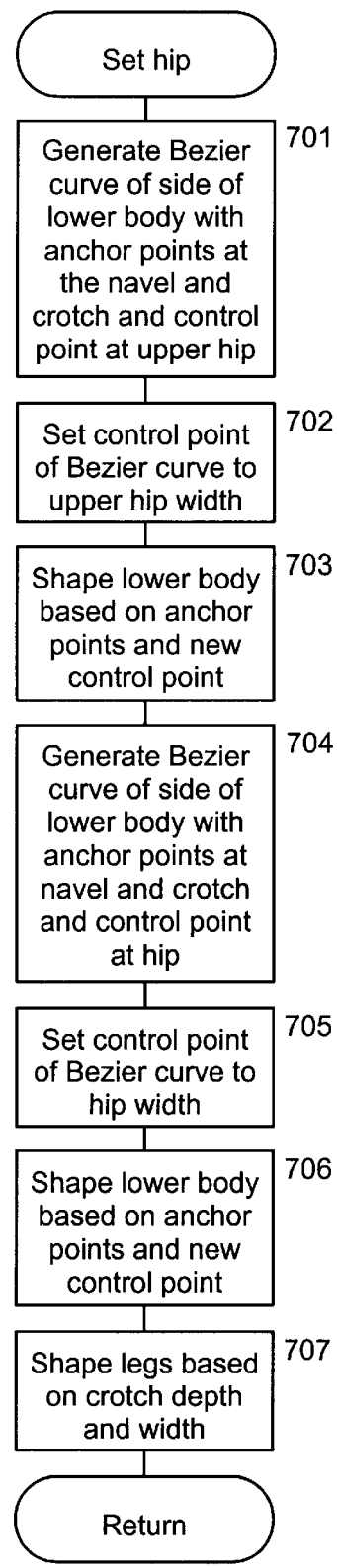
FIG. 7 is a flow diagram of the SetHip method.
Figure 8:
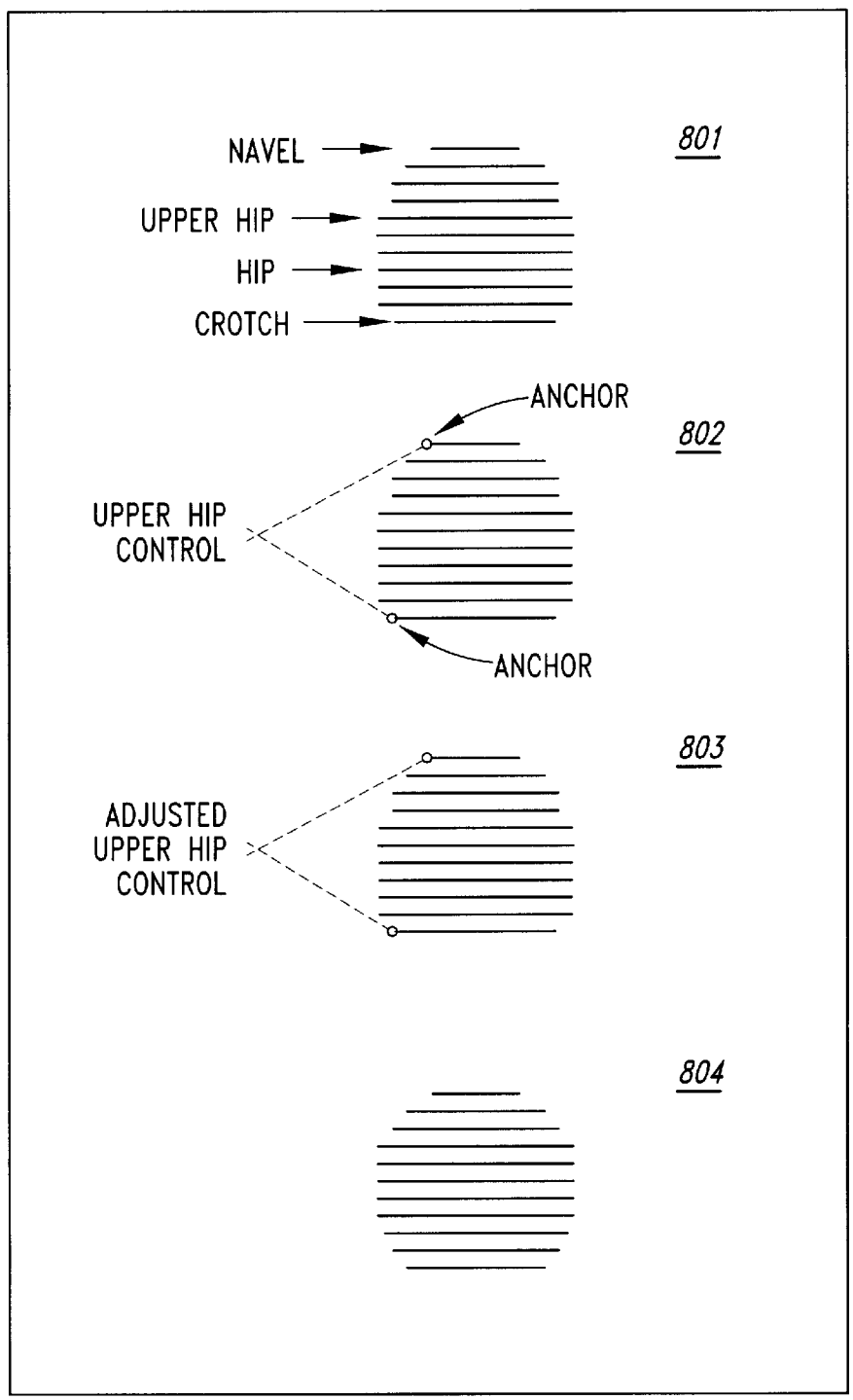
FIG. 8 illustrates the shaping of the hip based on the scale factors.

FIG. 7 is a flow diagram of the SetHip method. The SetHip method adjusts the hips and leers according to the scale factors. FIG. 8 illustrates the shaping of the hip based on the scale factors. The VDRS uses the upper hip width, the hip width, and the crotch width scale factors to adjust the shape of the standard hip to the shape of the person's hip. The VDRS adjusts the hip in two steps. First, the VDRS adjusts the contour lines between the navel and the crotch based on the upper hip width scale factor. Second, the VDRS readjusts the contour lines between the navel and the crotch based on the hip width scale factor and the crotch width scale factor, that is, the contour line corresponding to the crotch width is readjusted to represent the actual width and the contour lines above it are readjusted based on the hip width. The contour lines 801 represent the portion of the lower body between the navel and the crotch. The contour lines corresponding to the upper hip and hip measurements are illustrated. The contour lines 802 illustrate the curvature of the standard hip. The curvature is represented by a quadratic Bézier curve with anchor points at the maximum width of the body at the navel and the crotch and with a Bézier control point at the upper hip at the intersection of the tangents of the control points. The VDRS adjusts the control point of that curvature based on the upper hip width scale factor and generates a Bézier curve as shown in contour lines 803. The VDRS adjusts the points of each contour lines so that the widths of the contour lines follow the Bézier curve formed by the adjusted control point as shown by contour lines 804. The VDRS then repeats this process using the navel and the adjusted crotch width as anchor points and the height of the hip as the control point. In step 701, the SetHip method generates a Bézier curve corresponding to the left side of the lower body from the navel to the crotch with a Bézier control point at the height of the upper hip. Three points are returned that correspond to the two anchor points and the control point. In step 702, the SetHip method adjusts the width of the control point for the Bézier curve based on the upper hip width scale factor. In step 703, the SetHip method scales both sides of the lower body between the navel and the crotch according to the adjusted Bézier curve. The method scales a contour line by distributing the difference between the unscaled contour line and the scaled contour line evenly throughout the points of the contour line. For example, if the width of a contour line is to be increased by 1 inch and there are a total of 20 points on the contour line such that 2 points represents the left and right side and 9 points represent the front and back each, then each side point is moved out 0.5 inches each, the points next to it are moved out 0.4 inches each, and so on. The center points of the front and back are not moved. In steps 704–706, the SetHip method adjusts the lower hip based on the hip width and the crotch width. In step 704, the SetHip method generates a curve for the lower body anchored at the navel and the crotch and with a control point at the height of the hip. In step 705, the SetHip method adjusts the width of the control point for the Bézier curve based on the hip width scale factor and sets the lower anchor point based on the crotch width scale factor. In step 706, the SetHip method scales both sides of the lower body between the navel and the crotch according to the adjusted Bézier curve. In step 707, the SetHip method shapes the legs according to the crotch width and depth scale factors. The method adjusts each point of each contour line to effect the change in the width and depth that is based on the crotch scale factors. The SetHip method then returns.

Figure 9:
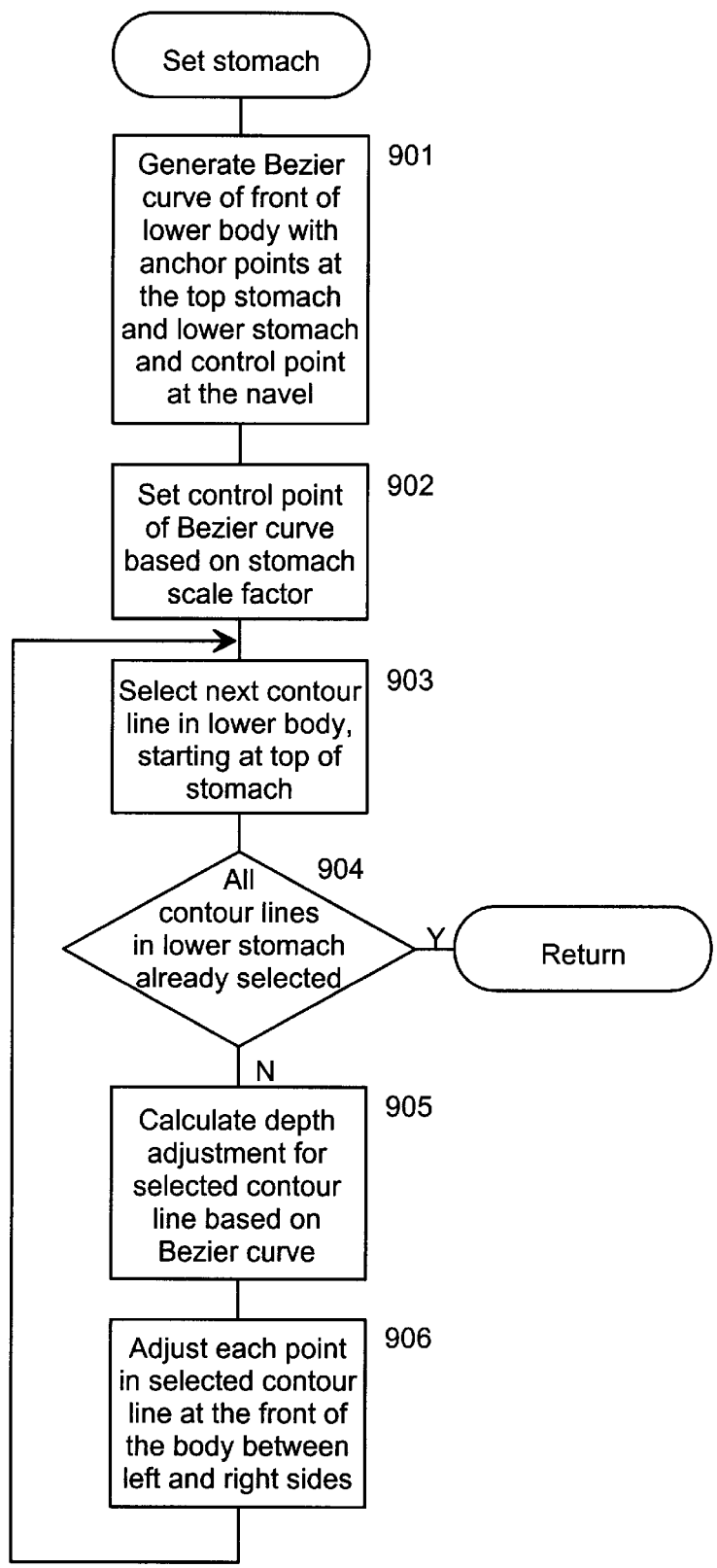
FIG. 9 is a flow diagram of the SetStomach method.

FIG. 9 is a flow diagram of the SetStomach method. The SetStomach method adjusts the front of the lower body from the top of the stomach to the bottom of the lower body. The method uses the stomach scale factor to shape the person's stomach. In step 901, the SetStomach method generates a Bézier curve based on the front of the lower body from the top of the stomach to the lower stomach with a control point at the navel. In step 902, the SetStomach method sets the z-coordinate of the control point of the Bézier curve based on the stomach scale factor. In steps 903–907, the SetStomach method loops adjusting each contour line in the lower body starting with the top of the stomach based on the adjusted Bézier curve. In step 903, the SetStomach method selects the next contour line of the lower body starting with the top of the stomach. In step 904, if all the contour lines in the lower stomach have already been selected, then the method retunes, else the method continues at step 905. In step 904, the SetStomach method calculates the adjustment for the selected contour line based on the Bézier curve. In step 905, the SetStomach method adjusts the selected contour line from a point that is defined as the right side of the stomach to a point that is defined as the left side of the stomach. The SetStomach method then returns.

Figure 10:
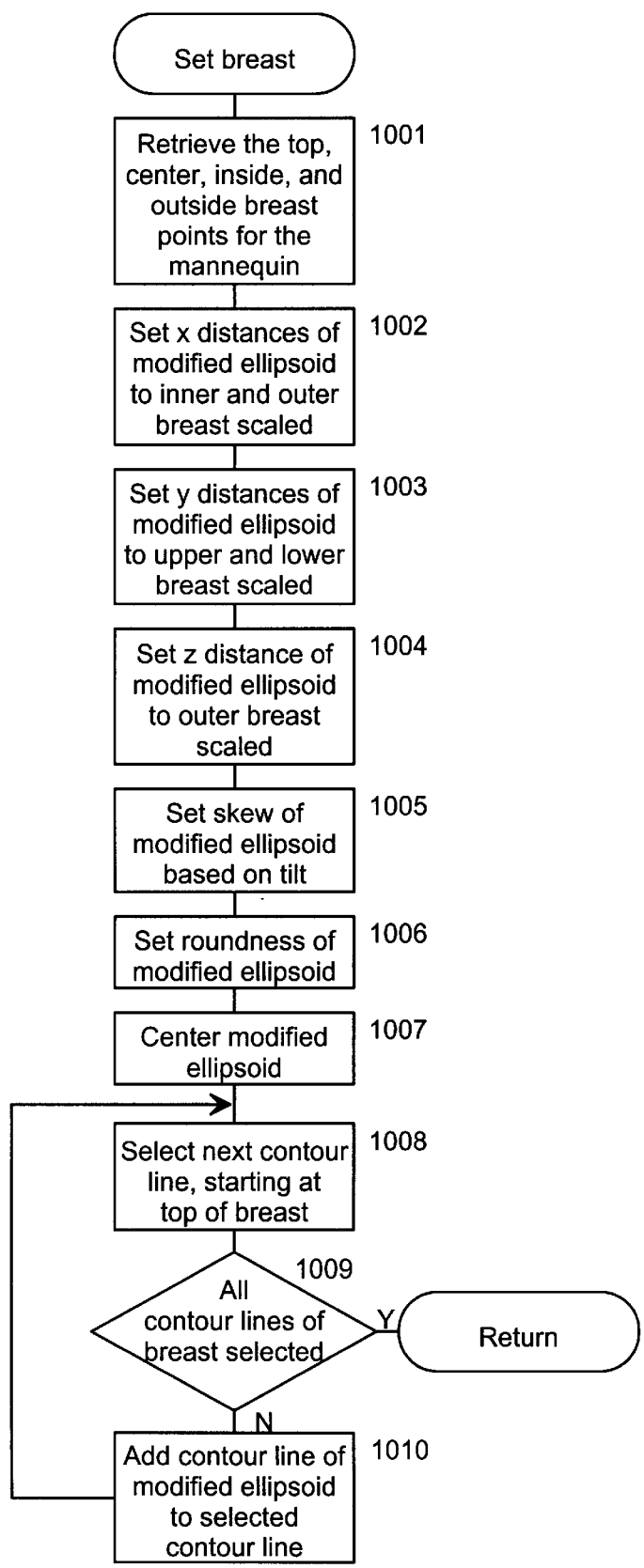
FIG. 10 is a flow diagram of the SetBreast method.
Figure 11:
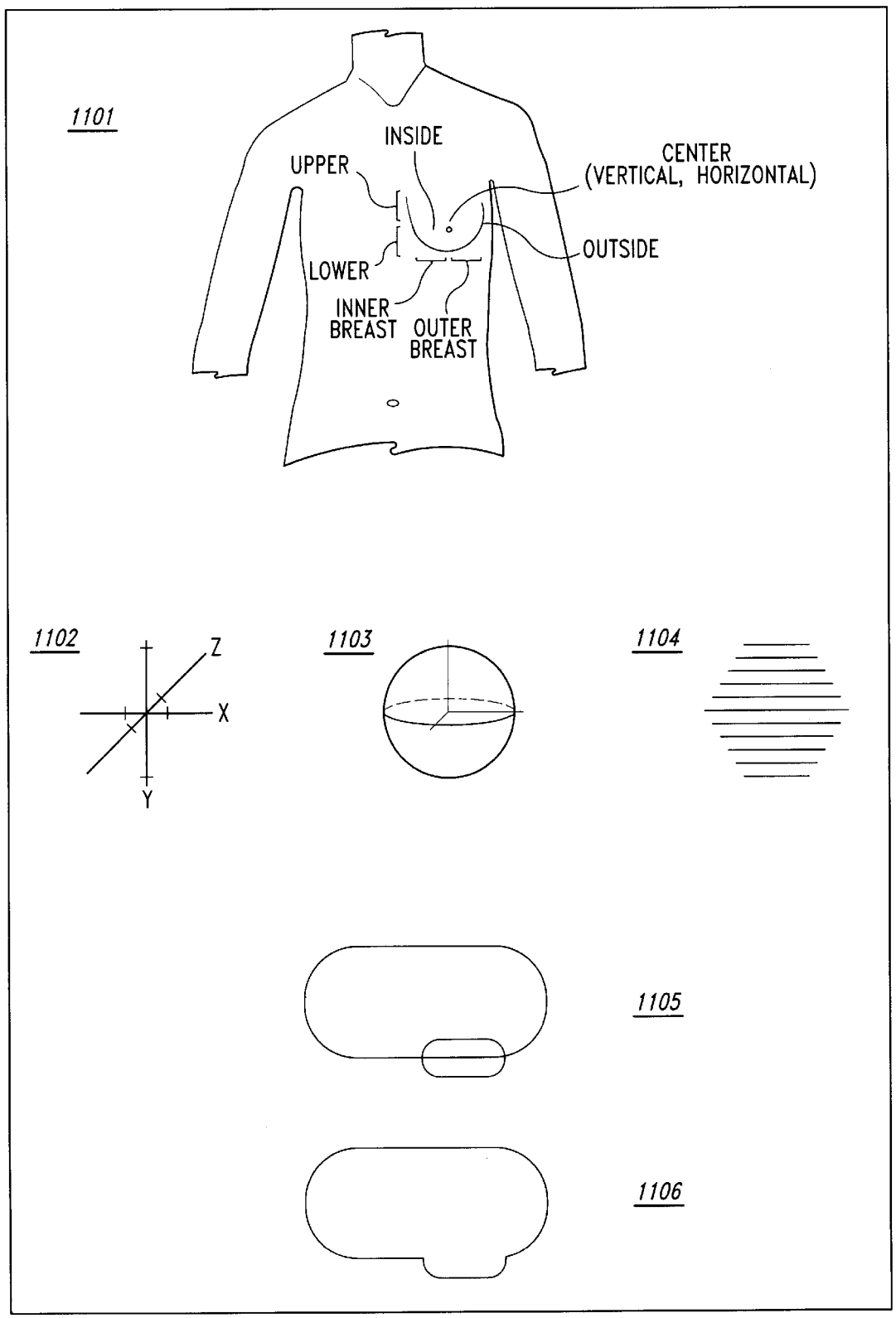
FIG. 11 is a diagram illustrating the shaping of the breast.

FIG. 10 is a flow diagram of the SetBreast method. The Set Breast method uses the breast scale factors to create a super ellipsoid in the shape of the person's breast. (A discussion of super ellipsoids is provided in Barr, A., "Superquadrics and Angle-Preserving Transformations," IEEE Computer Graphics and Applications, Jan. 1981, p. 11–23.) The SetBreast method then creates contour lines from the super ellipsoid which are in the same plane as the contour lines of the breast of the body data structure and positions the contour lines in the breast area of the body. The SetBreast method then adds the breasts to the contour lines of the body by setting each contour line of the body to perimeter of the union of the contour lines of the body and the contour lines of the super ellipsoid. FIG. 11 is a diagram illustrating the shaping of the breast. The breast scale factors are breast outer, breast inner, breast depth, breast upper, breast lower, breast tilt, breast center horizontal, and breast center vertical. The body 1101 illustrates some of these scale factors. The breast depth (not shown) represents the depth of the breast from the upper body. The breast tilt (not shown) represents an angle of rotation of the breast.

The super ellipsoid is an ellipsoid that is centered around an origin and that has six distances corresponding to the positive and negative points of intersection alone each of the axes. The axes 1102 illustrate the points of intersection of a super ellipsoid with the axes. The intersection of the x-axis is at distances 2 and $^-4$. The super ellipsoid also has two measurements to indicate the degree of roundness of each ellipsoid and a measurement indicating the skewing (tilt) of one of the axes. Once the SetBreast method sets the measurements of the super ellipsoid, the super ellipsoid is then transformed to a position at the center of the person's breast. The method then generates contour lines 1104 representing the surface of the super ellipsoid. Contour lines 1105 illustrate the contour line of the upper body with a contour line from the breast. The method then sets the person's contour line 1106 by taking the perimeter of the union of points.

In step 1001, the SetBreast method retrieves the points from the body data structure that represent the top, center, inside, and outside of the breast. In step 1002, the SetBreast method sets the x distances of the super ellipsoid based on the inner and outer distances as scaled by the breast inner and outer scale factors. In step 1003, the SetBreast method sets the y distances of the super ellipsoid based on the upper and lower distances as scaled by the breast upper and lower scale factors. In steps 1004, the SetBreast method sets the z distances of the super ellipsoid to outer distances as scaled by the breast depth scale factor. (The breast depth scale factor is relative to the outer distance.) In step 1005, the SetBreast method sets the skew of the z axis of the super ellipsoid based on the breast tilt scale factor. In step 1006, the SetBreast method sets the roundness of the super ellipsoid to maximum roundness. In step 1007, SetBreast the method sets the origin for the super ellipsoid to be centered on the body based on the breast center vertical and horizontal scale factors. In steps 1008–1010, the SetBreast method loops selecting contour lines starting at the top of the breast and adding a corresponding contour line from the super ellipsoid. In step 1008, the method selects tile next contour line starting with the top of the breast. In step 1009, if all the contour lines of the breast have already been selected, then the method returns, else the method continues at step 1010. In step 1010, the SetBreast method generates a contour line for the super ellipsoid. The SetBreast method then generates a contoul line that is the perimeter of the union of the points in the generated contour line and the selected contour line, and loops to step 1008. The SetBreast method repeats this process for both the left and right breasts.

Figure 12:
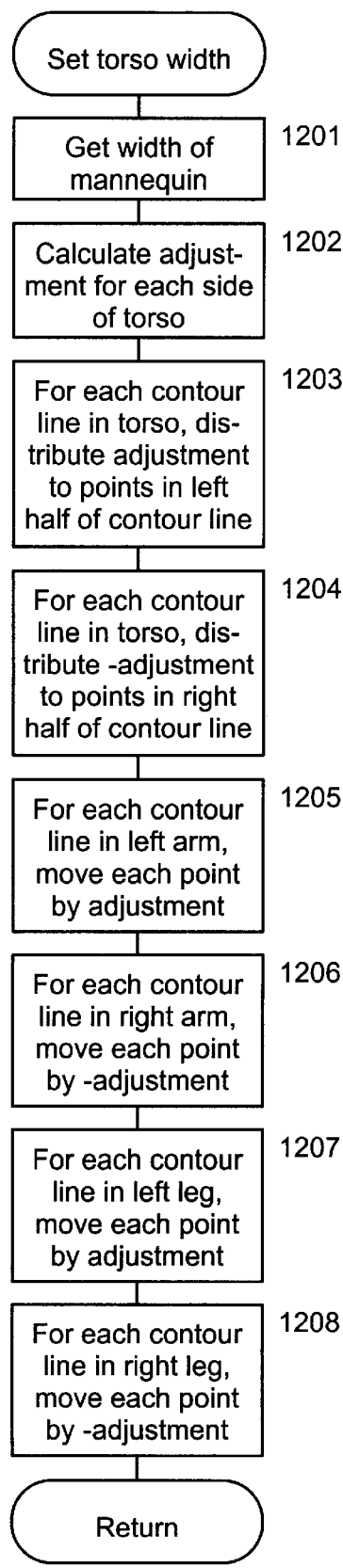
FIG. 12 is a flow diagram of the SetTorsoWidth method.

FIG. 12 is a flow diagram of the SetTorsoWidth method. The SetTorsoWidth method adjusts the width of the torso by the torso width scale factor. The method first calculates the adjustment in torso width based on the current torso width of the body. The method then, for each contour line in the torso, distributes half the adjustment throughout both right and left half of the contour lines. The limbs are also moved to compensate for the change in torso width. In step 1201, the SetTorsoWidth method sets the current torso width to the width of the first path of the lower body. In step 1202, the SetTorsoWidth method sets the adjustment for each side equal to the torso width times the torso width scale factor minus the torso width and then divided by two. In step 1203, the SetTorsoWidth method adjusts the left side of the contour lines in the torso by the adjustment amount. In step 1204, the SetTorsoWidth method adjusts the right side of the contour lines in the torso by the minus adjustment amount. In step 1205, the SetTorsoWidth method adjusts the contour line in the left arm by the adjustment amount. In step 1206, the SetTorsoWidth method adjusts the contour lines in the right arm by the adjustment amount. In step 1207, the SetTorsoWidth method adjusts the contour lines in the left leg by the adjustment amount. In step 1208, the SetTorsoWidth method adjusts the contour lines in the right leg by the minus adjustment amount. The SetTorsoWidth method then returns.

Figure 13:
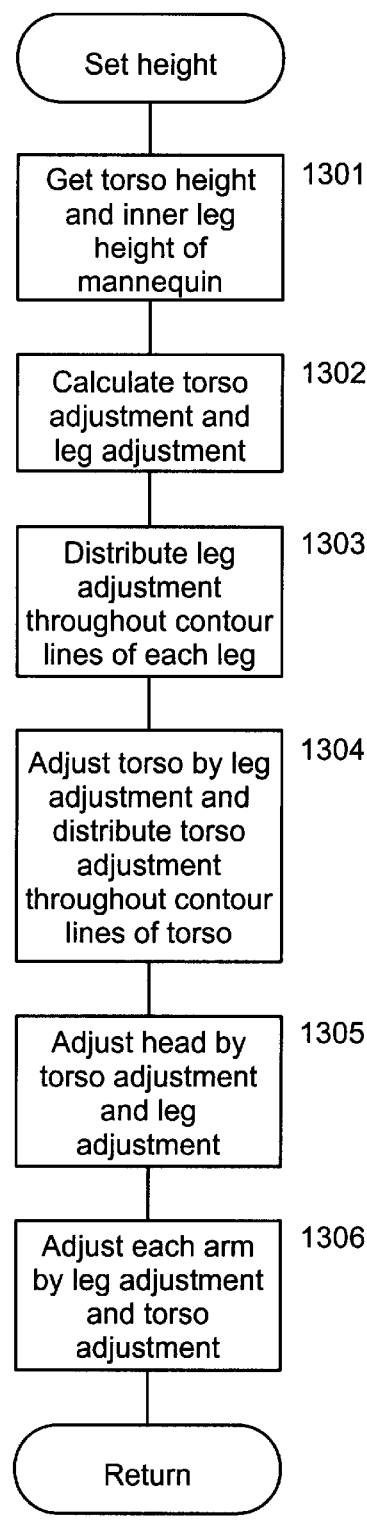
FIG. 13 is a flow diagram of the SetHeight method.

FIG. 13 is a flow diagram of the SetHeight method. The SetHeight method adjusts the height of the body to the person's height. The SetHeight method distributes the total height of the person throughout the head, torso, and legs. The head, torso, and arms are also adjusted by the height of the inner leg. The SetHeight method distributes the height of a body part equally among the y coordinates of the contour lines in the body part. In step 1301, the method gets the torso height and inner leg height from the mannequin. In step 1302, the method calculates the amount of adjustment to distribute throughout the head, torso and the legs. The adjustments are calculated based on the torso and inner leg scale factors. In step 1303, the method distributes the leg adjustments throughout the contour lines of each leg. In step 1304, the method adjusts the contour lines of the torso by the leg adjustment and distributes the torso adjustment throughout the contour lines of the torso. In step 1305, the method adjusts each point in the polygon mesh of the head by the torso and leg adjustments. In step 1306, the method adjusts the contour lines of each arm by the leg adjustment and torso adjustment. The SetHeight method then returns.

Tailor Garment

The VDRS represents each garment by a rectangular pixel map, a two-dimensional path of garment control points defining the bounds of the garment in the pixel map, and an allay parallel to path of points that describes the attributes of garment control points. The pixel map is preferably generated by digitizing an image of the garment as it is worn by the standard mannequin. Each pixel represents the color (e.g., in 8 bits or 24 bits) of the garment at a point. Each garment is also assigned a body area over which it is worn (e.g., bikini bottom or skirt). Each body area has predefined body control points that specify the points at which the garments may be adjusted to fit the body area. In addition, when a garment image is first provided to the VDRS, a user (e.g., a tailor) specifies the location of the garment control points on the garments, the alignment of these garment control points with the body control points, and the attributes of the garment control points. The attributes specify whether and how the area of garment around the garment control point is to be stretched or contracted to coincide with the corresponding body control point. The attributes include an ignore attribute, a straight line fit attribute, a curve fit attribute, and a dress point attribute. The ignore attribute indicates that this garment control point is not to be stretched to coincide with a body control point. The straight line attribute indicates that the straight line between two garment control points is to be maintained as straight as the garment is stretched or contracted to correspond to the body control points. The curve fit attribute indicates that the curve defined by three garment control points is to be maintained as a curve as the garment is stretched or contracted. The dress point attribute indicates that the curve defined by three garment control points is to be maintained between the upper two garment points when the garment is stretched or contracted. However, the bottom garment control point is to be directly below the center garment control point to give the effect of a dress hanging directly below the center control point, rather than tightly fitting the body area.

The VDRS fits (i.e., stretches or contracts) a garment to a person's body area in three steps. First, the VDRS generates a path of points defining that outline of the person's body area. The path includes the body control points. Second, the VDRS scales the pixel image to the height and width of the person's body area. Third, the VDRS aligns the garment control point to the body control points in accordance with the attributes.

Figure 14:
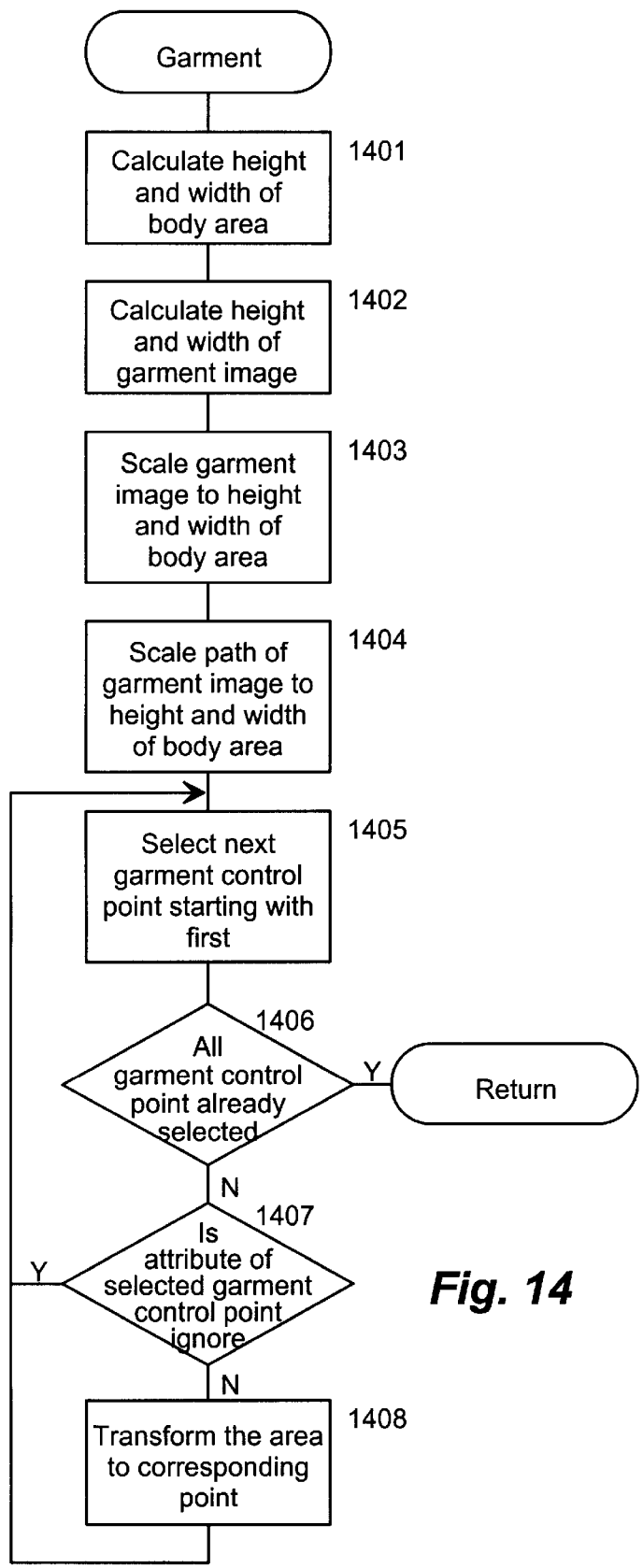
FIG. 14 is a flow diagram of the FitGarment method.

FIG. 14 is a flow diagram of the FitGarment method. The FitGarment method adjusts a garment to fit the person's body area. In step 1401, the method calculates the height and width of the person's body area. Each body area is defined to encompass certain contour lines of the body. The method calculates the height as the difference in height between the upper contour line and the lower contour line of the body area. The method calculates the width as the maximum difference between the left and right points of the contour lines. In step 1402, the method determines the height and width of the pixel map of the garment. In step 1403, the method scales the pixel map garment to the height and width of the person's body area. The method preferably scales by creating a new pixel map that with pixels either added or removed from each row of the pixel map. (A description of standard stretching and contracting techniques for a bitmap image is provided in Castleman, K., "Digital Image Processing," Prentice Hall, 1979.) The method adds or removes pixels in a manner that is distributed throughout each row. In step 1404, the method adjusts the position of the garment control points of the scaling of the pixel map. In steps 1405–1408, the method loops fitting the garment based on the attributes of the garment control points. In step 1405, the method selects the next garment control point starting with the first. In step 1406, if all the control points have already been selected, then the attribute of the method returns, else the method continues at step 1407. In step 1407, if the attribute of the selected garment control point is to be ignored, then the method loops to step 1405 to select the next garment control point, else the method continues at step 1408. In step 1408, the method transforms the area of the garment in proximity to the selected garment control point to the area in proximity to the corresponding body control point. The VDRS system preferably uses conventional stretching techniques for pixel images that ensure that patterns and lines are stretched in continuous and consistent manner. The method then loops to step 1405 to select the next garment control point.

Figure 15:
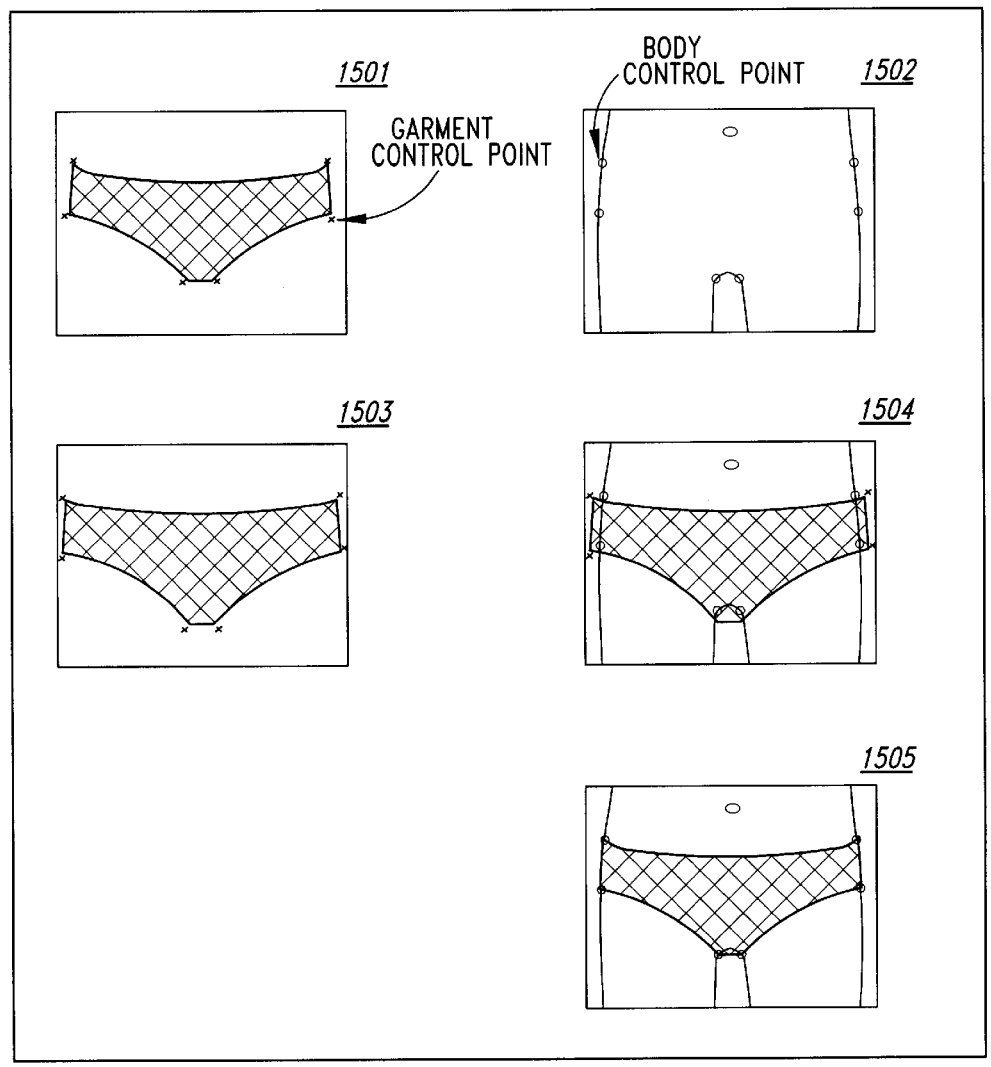
FIG. 15 illustrates the fitting of a garment.

FIG. 15 illustrates the fitting of a garment. The pixel map 1501 contains the pixel image of a bikini bottom. The x's denote the garment control points of the bikini bottom outline. The image 1502 illustrates the bikini bottom body area, and the o's represent the body control points of the bikini bottom outline. The pixel map 1503 represents the bikini bottom garment after it is expanded (stretched) to the approximate width and height of the person's bikini bottom body area. The image 1504 illustrates this expanded bikini bottom pixel image over the person's body area. Although the overall bikini bottom approximately fits the body area, the control points as indicated by the x's and o's do not coincide. The VDRS system, in this case, contracts the control points of the bikini bottom garment so that the garment tightly fits the shape of the person as shown in image 1505.

Figure 17:
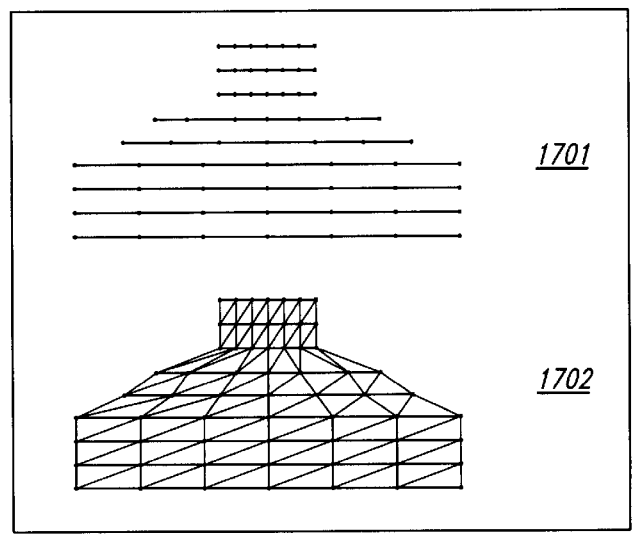
FIG. 17 illustrates the generation of the polygons.
Figure 16:
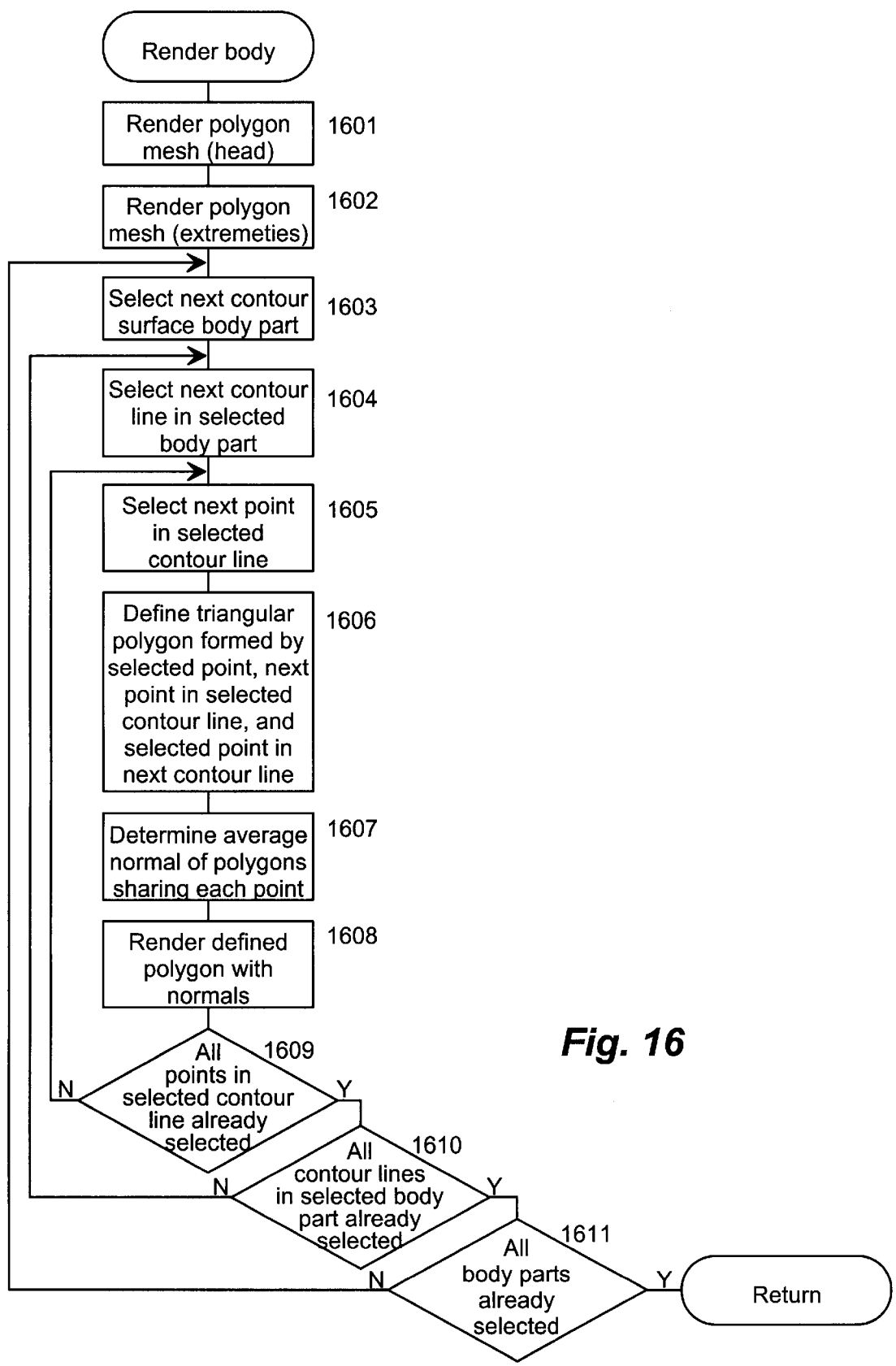
FIG. 16 is a flow diagram of the RenderBody method.

FIG. 16 is a flow diagram of the RenderBody method. The RenderBody method uses a standard mesh rendering technique that is passed the vertices of each polygon in the mesh, the normal of each vertex, and an angle of light source. The RenderBody method invokes the rendering technique for each polygon in the head and the extremities. The RenderBody method also generates polygons between the contour lines and invokes the rendering technique to output the generated polygons. FIG. 17 illustrates the generation of the polygons. The upper body 1701 is represented by 9 contour lines. The upper body 1702 is shown with a triangular polygon mesh. In step 1601, the method renders the polygon mesh of the head using standard rendering techniques. In step 1602, the method renders the polygon mesh of the extremities using the standard rendering techniques. In steps 1603–1611, the method loops processing each body part, each contour line in the body part, and each point of the contour line. In step 1603, the method selects the next body part. In step 1604, the method selects the next contour line in the selected body part. In step 1605, the method selects the next point in the selected contour line. In step 1606, the method defines a triangular polygon formed by the selected point, the corresponding point in the next contour line, and the next point in the selected contour line. In step 1606, the method calculates an average normal for each vertex of the polygon that is the average of the normal of the polygons that share the vertex. In step 1608, the method invokes the standard rendering techniques to render the polygon. In steps, 1609–1611, the method determines whether the last point in the selected contour line, the last contour line in the selected body part, or the last body part has already been selected and loops accordingly.

After the person's body is rendered, the VDRS system then renders the fitted garments. The VDRS renders a fitted garment by determining the area of the display which encompasses the person's body area and displays the pixel image of the fitted garment of the display area. In a preferred embodiment, a digitized image of the person's face is also displayed over the rendered head.

The VDRS can also display side views and back views of the person's body wearing the garment. For each view, a digitized image of the mannequin wearing the garment is made. Before fitting the garment to the person's body, the person's body (the contour surfaces and polygon meshes as shaped to the person's figure) are rotated based on the view angle. The image of the garment made at the same angle is then tailored to the person's body as rotated. In one embodiment, the VDRS allows for various angles of rotation (e.g., 45°, 90°, 135°, and 180°). For each angle of rotation, an image of the garment is generated. For each view angle, garment control points are defined for the garment and body control points are defined for the body area.

As discussed above, the VDRS uses a super ellipsoid to represent the shape of a person's breast. A super ellipsoid can also be used to represent muscles placed on the person's body. For example, a super ellipsoid in the shape of a bicep can be generated, converted to contour lines, and combined with the person's upper arms to show how the person would look after muscles were developed. Thus, the VDRS can be used to display the image of a person with various alterations such as change in breast or muscle size.

The principles of the VDRS can also be applied to non-human objects. For example, the various parts of a couch can be represented by contour surfaces and various different materials and patterns can be tailored to the couch. The couch can then be rendered along with the tailored material. One skilled in the art would appreciate that portions of the underlying objects that would be covered by the material (or garment) need not be rendered. Only the material itself need be displayed.

Figure 18B:
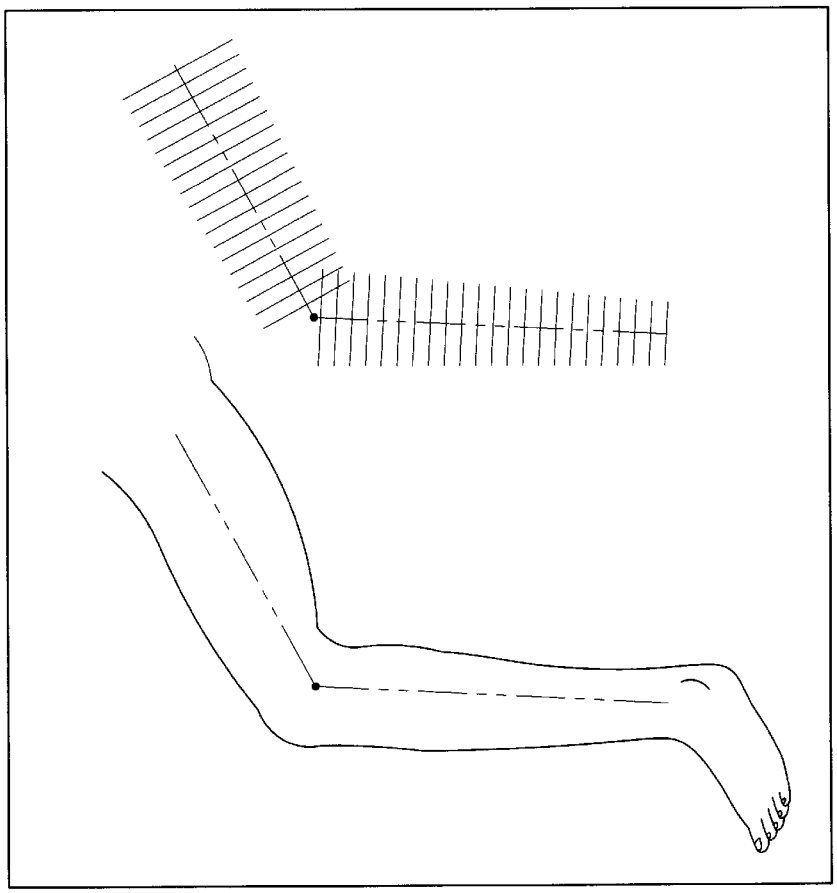
FIG. 18 illustrates movement of a leg.
Figure 18A:
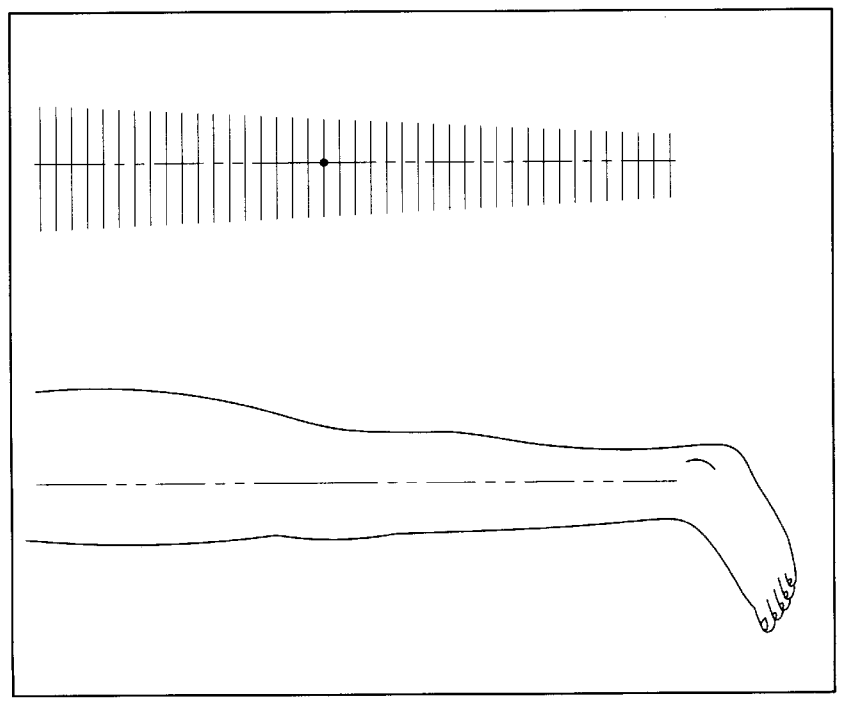

The use of contours lines to represent the person's body permits efficient animation of the person's body. Movement of a body part can be illustrated by transforming each point of each contour line to a position. FIG. 18 illustrates movement of a leg. The system transforms each contour line of the upper leg to a new plane that is perpendicular to the bone in the upper leg. The system varies the slope of the plane of the contour lines by the knee to allow for a smooth transition from the upper leg to the lower leg. Because the contour lines are initially in planes that are horizontal, the transformation can be performed efficiently. Thus, to show animation, subsequent movement is shown by transforming the initial contour lines that are horizontal, rather than transforming the last transformed contour lines.

The principles of the VDRS can be used to electronically transfer and display a person's figure. Since the person's figure can be represented by the measurements, the person's image can be generated and displayed. This may be particularly useful, for example, in an electronic mail environment where measurement can be mailed and the person's figure viewed without the overhead of transmitting a digitized image of the person. In addition, by specifying various predefined body movements, the person's figure can be displayed showing a specified movement. For example, the movement could indicate the person's figure saluting or bowing.

Although the present invention has been described in terms of preferred embodiments, it is not intended that the invention be limited to these embodiments. Modification within the spirit of the invention will be apparent to those skilled in the art. The scope of the present invention is defined by the claims that follow.

I claim:

1. A method in a computer system for displaying clothing on a rendered image of a human body, the method comprising the steps of:

receiving a series of contour lines defining the three-dimensional shape of the human body;

receiving a sequence of points defining the two-dimensional shape of the clothing;

scaling sequence of points defining the two-dimensional shape of the clothing to the approximate width of a portion of the human body over which the clothing is worn;

for each point of the two-dimensional shape,
identifying a corresponding point on a contour line; and
adjusting the point of the two-dimensional shape of the clothing to correspond to the identified point; and rendering the shape of the human body on a display device; and rendering the sealed and adjusted two-dimensional shape of the clothing on the display device to effect the display of the human body wearing the clothing.

2. The method of claim 1 wherein the two-dimensional shape is generated from an image of he clothing actually a human body or a mannequin of a human body to give the cloting a three-dimensional appearance when rendered on the display device.

3. A method in a computer system for combining surfaces of a first and a second graphics objects, each graphics object represented by a plurality of contour lines, each contour line representing a portion of the surface of the graphics object being in a single plane and having a plurality of points, the plurality of contour lines being in parallel planes, each contour line of the first object having a corresponding contour line of the second object, the corresponding contour lines of the first and second objects being in the same plane, the method comprising the steps of:

for each of the plurality of corresponding contour lines of the first and second graphics objects,
for each point of the contour line of the first graphics object,
determining whether the point is within the contour line of the second graphics object;
for each point of the contour line of the second graphics object,
determining whether the point is within the contour line of the first graphics object;
based on the determinations, selecting a plurality of the points of the corresponding contour lines of the first and second graphics objects as representing the portion of the combined surfaces of the first and second graphics object that corresponds to the corresponding lines of the first and second graphics objects.

4. The method of claim 3 wherein the step of selecting the plurality of points selects those points of the contour line of the first graphics object that are determined to be outside the contour line of the second graphics object and those points of the contour line of the second graphics object that are determined to be outside the contour line of the first graphics object.

5. The method of claim 3 wherein the step of selecting the plurality of points selects those points of the contour line of the first graphics object that are determined to be outside the contour line of the second graphics object and those points of the contour line of the second graphics object that are determined to be inside the contour line of the first graphics object.

6. The method of claim 3 wherein the step of selecting the plurality of points selects those points of the contour line of the first graphics object that are determined to be inside the contour line of the second graphics object and those points of the contour line of the second graphics object that are determined to be outside the contour line of the first graphics object.

7. The method of claim 3 wherein the step of selecting the plurality of points selects those points of the contour line of the first graphics object that are determined to be inside the contour line of the second graphics object and those points of the contour line of the second graphics object that are determined to be inside the contour line of the first graphics object.

8. The method of claim 3 wherein the first graphics object is a person's body and the second graphics object is a muscle to be placed on the person's body.

9. The method of claim 3 where the first graphics object is a portion of a person's body and the second graphics object is a muscle to be placed on the portion of the person's body.

10. A method in a computer system for generating a polygon mesh representation of a graphic object, the graphics object being represented by a plurality of contour lines, each contour line representing a portion of the surface of the graphics object, each contour line being in a plane that is parallel to the planes of the other contour lines, each contour line being represented by a predefined number of points, the method comprising the steps of:

for each contour line,
for each pair of adjacent points of the contour line,
for each contour line that is adjacent to the contour line, defining a triangular polygon formed by the pair of adjacent points and one point of the adjacent contour line, wherein the pair of adjacent points of the contour line and the one point of the adjacent contour line are vertices of the triangular polygon of the polygon mesh.

11. The method of claim 10 including the steps of:

for each vertex of the polygon mesh, assigning a normal to the vertex that is an average of normals of each triangular polygon that shares the vertex; and rendering the polygon mesh by specifying each vertex with its assigned normal.

12. The method of claim 10 including the step of altering the predefined number of points of a contour line to alter the resolution of the generated polygon mesh.

13. The method of claim 10 including the step of increasing the number of contour lines that represent the graphics object to increase the resolution of the generated polygon mesh.

14. A method in a computer system for representing movement of a graphics object, the graphics object being represented by a plurality of contour lines, each contour line representing a portion of the surface of the graphics object, each contour line being in a plane that is parallel to the planes of the other contour lines, the method comprising the steps of:

for each contour line,
selecting a plane to which the contour line is to be transformed; and
transforming each point of the contour line to the selected plane; and
rendering the transformed contour lines on a display device.

15. The method of claim 14 wherein the step of rendering includes the steps of:

generating a polygon mesh from the transformed points of the contour lines; and
rendering the polygon mesh on the display device.

16. The method of claim 14 wherein the graphics object has an initial orientation corresponding to a vector that is perpendicular to the parallel planes, and including the steps of:

prior to transforming the points of the contour lines,
assigning a new orientation for the graphics object; and
transforming the points of the contour lines to parallel planes that are perpendicular to the new orientation.

17. The method of claim 14 wherein the steps are repeated to simulate animation of the graphics object.

18. The method of claim 14 wherein each contour is in plane that is parallel to plane formed by two axes in a three-dimensional space.

19. A method in a computer system for representing a human body in a computer system, the method comprising the steps of:

generating series of contour lines for each body part of a human body of a standard shape, each contour line being in a plane that is parallel to the planes of the other contour lines;

receiving a plurality of measurements defining a custom shape of the human body to be represented; and adjusting the position of points of the generated series of contour lines based on difference between the standard shape and the custom shape.

20. The method of claim 19 wherein the body pairs are the torso, arms, and legs.

21. A method in a computer system for displaying a two-dimensional shape on a rendered image of a three-dimensional graphics object, the method comprising the steps of:

receiving a series of contour lines defining the three-dimensional shape of the graphics object;

receiving a sequence of points defining the two-dimensional shape;

scaling the sequence of points defining the two-dimensional shape to the approximate width of a portion of the graphics object over which the shape is to be displayed;

for each point of the two-dimensional shape,
identifying a corresponding point on a contour line; and
adjusting the point of the two-dimensional shape to correspond to the identified point; and rendering the shape of the graphics object on a display device; and rendering the scaled and adjusted two-dimensional shape on the display device to effect the display of the shape on the graphics object.

22. The method of claim 21 wherein certain points of the shape are defined as control points for controlling the adjusting of the control points to the graphics objects.

23. The method of claim 22 wherein a point identified as a control point is moved when adjusting to the graphics shape.

24. The method of claim 21 wherein the two-dimensional shape is generated from an image or an object overlaying a standard object that corresponds to the three-dimensional graphics object to give the two-dimensional shape a three-dimensional appearance when rendered on the display device.

25. The method of claim 21 wherein the step of rendering the shape of the graphics object, renders on the portion of the graphics object that would not be overlayed by the rendered two-dimensional shape.

26. A computer system for displaying an image of first object wearing a second object that generally conforms to a shape of the first object when worn, comprising:

means for generating a standard two-dimensional image of the second object of a standard size worn by the first object of a standard size;

means for representing the first object as a series of contour lines defining the shape of the first object in three dimensions;

means for receiving indications of a custom size of the first object;

means for adjusting the series of contour lines based on the indications of the custom size;

means for tailoring the two-dimensional image of the second object to the adjusted series of contour lines; and means for rendering the first object on a display device based on the adjusted series of contour lines and the tailored two-dimensional image of the second object on the display device.

* * * * *